Patented Dec. 24, 1940

2,225,665

UNITED STATES PATENT OFFICE 2,225,665

AZO PIGMENT AND COATING COMPOSITION CONTAINING THE SAME

Alfred Siegel, Roselle, N. J., assignor to E. I. du Pont de Nemours & Company, Wilmington, Del., a corporation of Delaware No Drawing. Application September 29, 1939, Serial No. 295,751

10 Claims. (Cl. 260—40)

This invention relates to the production of organic pigment toners adapted for use in the preparation of relatively durable coating compositions of the resinated type.

More specifically, the invention relates to the preparation of certain relatively insoluble azo pigments, particularly their manganese salts, which pigments are eminently suited for use in the manufacture of stable, synthetic resin enamels of red to maroon shade.

Resinated coating compositions, particularly synthetic resin enamels, are well-known to the coating art. Among the synthetic resin which are employable in such coating compositions, those comprising the polyhydroxy alcohol-polycarboxylic acid condensation products, or alkyd resins, are most outstandingly useful. While relatively durable films generally result from these compositions, great difficulty is encountered in procuring satisfactory products in the range of red to maroon enamels. This for the reason that the coloring agents or pigments employed therein are largely responsible for any lack of durability exhibited by the resulting film. Thus, due to its inherent nature, the pigment or coloring agent may exert a serious, adverse effect upon film durability; or, if it affords durability, may be inherently poor in other pigment essentials, particularly ready dispersibility and freedom from oil solubility (including solubility in organic solvents). As will be evident, the enamels become directly handicapped by the deficiencies of the pigment, and a definite need has therefore existed, especially in the field of organic red to maroon pigments, for pigments which afford ready production of films having a pleasing shade and excellent durability characteristics, and which are inherently lacking in oil solubility or any tendency to "bleed" in the enamels.

It is among the objects of this invention, therefore, to overcome these and other difficulties encountered when prior organic pigments are used in the production of red to maroon coating compositions, and in particular to provide novel types of azo pigments of red to maroon shade which are readily adapted for use in such coating compositions, especially in those of the resin vehicle or synthetic alkyd resin type. It is among the special objects of this invention to fulfill the long-felt need for more durable red to maroon enamels by providing novel, relatively insoluble azo pigments which are relatively inexpensive to manufacture, which give films having exceptionally high durability characteristics, which are readily dispersible in and free from any tendency to bleed in the enamel, and which in particular are relatively insoluble in the vehicles or thinners usually employed in such enamels. Other objects and advantages will appear from the ensuing description of the invention.

These and other objects are attainable in this invention which embodies the discovery that quite unexpectedly and in contradistinction to other metallic salts, the manganese salts of certain red to maroon azo pigments present an exceedingly high quality pigment which is highly suited for use in the preparation of durable resinated coating compositions. In its broader aspects, therefore, the invention comprises manufacturing and thereafter employing as an essential pigment in a resinated coating composition the manganese salt of the azo dyestuff having the probable generic formula:

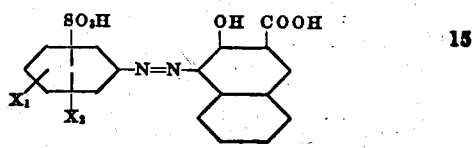

in which $X_1$ represents a halogen and $X_2$ represents hydrogen or an alkyl group.

In a more specific and preferred embodiment, the invention comprises manufacturing and using as an essential pigment ingredient in synthetic resin enamels the manganese salts of the azo pigment dyestuffs of the probable (as the free acid) formula:

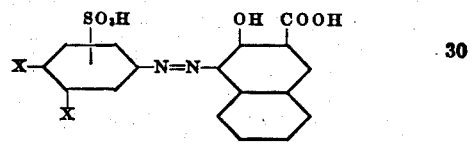

wherein one X represents a halogen and the other represents hydrogen or a methyl group.

In its preferred form, the invention consists of the incorporation in an alkyd resin vehicle of one or more of the manganese salts of the following azo pigment dyestuffs:

1. 4 chlor-aniline-2-sulfonic acid, coupled with beta hydroxy naphthoic acid, of the probable (as the disodium salt) formula:

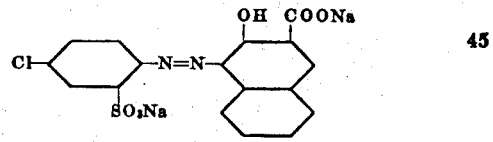

2. 4 chlor-aniline-3-sulfonic acid coupled with beta hydroxy naphthoic acid, of the probable (as the disodium salt) formula:

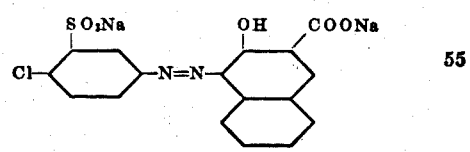

3. 2 - chlor - 5 - amino-toluene-4-sulfonic acid coupled with beta hydroxy naphthoic acid, of the probable (as the disodium salt) formula:

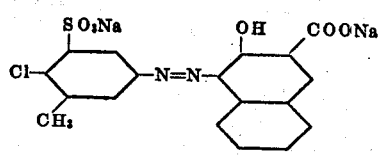

4. 2 - chlor - 4 - amino-toluene-5-sulfonic acid coupled with beta hydroxy naphthoic acid, of the probable (as the disodium salt) formula:

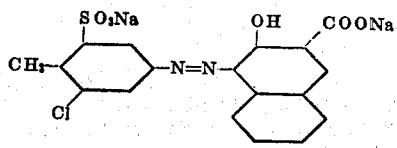

In practically adapting the invention, the manganese pigment toner is prepared in accordance with suitable, well-known azo coupling technique. Thereafter, it is incorporated in an alkyd resin vehicle, the relative amount of pigment and vehicle depending upon the desired properties of the finished enamel.

In effecting production of the pigment, a first component thereof, such as 4 chlor-aniline-2 sulfonic acid (or any other suitable component or intermediate, such as those mentioned or contemplated herein) is diazotized in a conventional manner by dissolving the component in a dilute solution of an alkali, preferably sodium hydroxide, precipitating with hydrochloric acid, and adding a solution of sodium or other alkali nitrite. The resulting diazo is then coupled with an alkaline solution of beta-hydroxynaphthoic acid and the resulting slightly soluble disodium or other alkali salt is then suitably isolated by filtration. The alkali salt dyestuff thus obtained is then caused to be reacted under slightly acid, substantially neutral or even slightly alkaline conditions (with relatively minor changes in shade), with a soluble salt of manganese, preferably sulfate, or other soluble manganese salt, such as the chloride, acetate, etc. The precipitated dyestuff is then recovered by filtering, washing free from soluble salts, such as sulfates, and dried. The pigment obtained comprises an improved product of high tinctorial power, excellent purity of shade and great stability, being free from objectionable oil solubility or solubility in organic solvents normally employed in coating compositions.

To a more complete understanding of the invention the following specific examples are given of various methods for preparing the various manganese toners as pigments. Obviously these examples are merely illustrative in character and are not to be construed as in limitation of the invention:

EXAMPLE I 45 parts of the dye obtained by coupling diazotized 4-chlor-aniline-3-sulfonic acid with beta hydroxy naphthoic acid (100% basis) are dissolved in 4000 parts of water at approximately 75° C. and a suspension of 1.5 parts of Para soap is added to the solution. The dye is precipitated by adding in about ten minutes a solution of 18 parts of manganous sulfate (100% $MnSO_4$) in 320 parts of water at 75° C. After holding for some time at 75° C., the pigment is filtered, washed free from sulfates, and dried at about 60° C. The resulting pigment, about 46.5 parts, is a dark, bright red product.

EXAMPLE II 45 parts of the dye used in Example I (100% basis) are dissolved at about 75° C. in 4000 parts of water and a suspension of 1.5 parts of Para soap in about 20 parts of water is added thereto. The dye is precipitated by adding in about five minutes a solution of about 38 parts of manganous sulfate (100% $MnSO_4$) in 1200 parts of water at 75° C. After a short stirring period, the suspension is made alkaline with about 12 parts of caustic soda dissolved in 150 parts of water. After further stirring, the pigment is filtered, washed free from sulfates, and dried at about 60° C. The resulting pigment, about 63 parts, is a maroon pigment of pleasing shade, much darker than that of Example I.

EXAMPLE III 45 parts of the dye obtained by coupling diazotized 4-chlor-aniline-2-sulfonic acid with beta hydroxy naphthoic acid are dissolved in 6000 parts of water at about 60° C., a suspension of about 6 parts of Para soap in 40 parts of water is added thereto and, after a short stirring period, the pigment is precipitated in about twenty minutes by adding a solution of about 22 parts of manganous sulfate (100% basis) in 100 parts of water. The suspension is developed at the boil, filtered, and washed substantially free from sulfates. The resulting pigment, about 48 parts, is a light red product.

EXAMPLE IV 46.4 parts of the azo dye obtained by coupling diazotized 2-chlor-4-amino-toluene-5-sulfonic acid with beta hydroxy naphthoic acid are well slurried with about 3000 parts of water at about 25° C., a suspension of 4 parts of Para soap in about 16 parts of water is added thereto and the mixture acidified with about 6 parts of acetic acid (100% basis) diluted with equal parts of water. The pigment is precipitated by adding in about ten minutes a solution of 27 parts of manganous sulfate (100% basis) in 600 parts of water at about 25° C. After development at the boil the pigment is filtered, washed free from sulfates, and dried at about 60° C. The resulting product, 47 parts, is a very dark red pigment.

EXAMPLE V 46.5 parts of the dye obtained by coupling diazotized 2-chlor-5-amino toluene-4-sulfonic acid with beta hydroxy naphthoic acid are well slurried with about 4000 parts of water at about 75° C. After adding a suspension of 1.4 parts of Para soap in about 20 parts of water, the pigment is precipitated by adding a solution of about 37.5 parts of manganous sulfate (100% $MnSO_4$) in 2000 parts of water at 75° C. After a short development at 75° C., the suspension is filtered, washed free from sulfates and the product dried at about 60° C. About 52 parts of a dark red pigment of a desirable shade is obtained.

When the manganese toners contemplated herein are employed as essential pigment ingredients in coating compositions, and particularly those of the resinated type, such as alkyd resin enamels, it will be found that their unique, unexpected properties become imparted to said compositions to insure ultimate procurance of a highly stable coating film possessing excellent and superior durability properties.

As stated, resinated coating compositions or enamels containing an alkyd resin and their methods of preparation are well-known. They comprise certain types of polyhydric alcohol-polybasic acid resins, and preferably the so-called modified polyhydric alcohol-polybasic acid resins or resinous condensation products which result from the reaction of one or more polyhydric alcohols and one or more polybasic acids with one or more modifying ingredients, such as drying oils, semi-drying oils, synthetic drying oils and monobasic acids, etc. One notable and common example of these resins comprises the condensation products of glycerol and phthalic anhydride with linseed oil acids. These synthetic resin vehicles or solutions are usually prepared by heating a mixture of the resin producing ingredients, other than solvents, at temperatures above the melting point and until resinification becomes complete. Obviously, the properties of the resin can be modified as desired by suitable variation in the ingredients and in the conditions of preparation. Though many and varying forms of useful resin compositions exist, the following comprise typical, preferred examples. These are given merely in illustration but not in limitation and the figures are in percentage composition by weight:

*Resin solution A*

| | |
|---|---|
| Linseed oil | 15.0 |
| China-wood oil | 7.3 |
| Glycerine | 8.5 |
| Litharge | Trace |
| Phthalic anhydride | 20.7 |
| Petroleum naphtha | 48.5 |
| | 100.0 |

*Resin solution B*

| | |
|---|---|
| Linseed oil | 49.8 |
| Glycerine | 10.4 |
| Litharge | Trace |
| Phthalic anhydride | 23.6 |
| Petroleum solvent | 16.2 |
| | 100.0 |

*Resin solution C*

This is a rosin modified phenol formaldehyde resin used in a suitable solvent. A suitable illustration is the material marketed under the trade name "Amberol F-7," dissolved in a high solvency petroleum solvent.

While the resin compositions enumerated comprise drying oil modified alkyd resins, the preferred type, and certain modified phenol-formaldehyde resins, these merely comprise exemplary types which are especially useful in coating compositions intended for exterior application. Other resins, such as certain hydrocarbon resins, those which are derivatives of rubber, the various vinyl resins and the like, may also be used and with equally beneficial effects in the invention. Accordingly, the term "resinated coating composition" or "resin vehicle," as employed herein and in the appended claims, is intended to embrace all such useful types of resins and especially the synthetic variety adapted for use in all types of coating compositions.

In preparing coating compositions containing a pigment or mixtures thereof of this invention, one may resort to conventional coating preparation procedures. Thus, a suitable proportion of the pigment may be ground or dispersed in a conventional mill, such as a ball mill, with the resin or other coating vehicle and in the presence of sufficient solvent and diluent to provide a consistency suited to the dispersing device used. The grinding operation is continued until the dispersion becomes substantially complete. Said grinding may take place in the presence or absence of agents adapted to improve the ease of dispersion, or other suitable modifying agents.

Any desired formulation may be resorted to in preparing the coating compositions, the ingredients employed therein and their relative proportions being obviously subject to wide variance. For purposes of illustration, but not in limitation, the following examples of suitable alkyd resin enamel coating compositions employing the new pigments of this invention and the resins hereinabove mentioned are given, the figures in each instance being percentage composition by weight. As stated, it will be understood that these examples are illustrative in character and due variance in the ingredients and proportions thereof to obtain desired changes in degree of gloss, depth of shade, or the like, may be made therefrom:

EXAMPLE VI

*Alkyd resin enamel*

| | |
|---|---|
| Manganese salt of azo dye pigments | 8 |
| Resin solution A | 64 |
| Solvent (mixture of aliphatic and aromatic hydrocarbons) | 28 |
| | 100 |

When enamels of this type are used to coat metallic panels which are exposed to the weather, it is found that even after an exposure of about one year the enamel shows substantially no failure. On the other hand, other red to maroon enamels fail badly in much less than one year. Moreover, other metallic salts, such as the calcium salt, of the same azo dyes are found to fail badly in considerably less than one year. The superiority of the enamel, in view of the employment of pigments of this invention, is thus clearly shown.

Similarly, other durable enamels and coating compositions may be prepared using any one of the pigments hereinabove disclosed, or mixtures of the same with any of the common synthetic resins. Thus, among other illustrative types of resinated coatings the following may be mentioned:

EXAMPLE VII

*Alkyd resin enamel*

| | |
|---|---|
| Manganese salt of azo dye pigments | 10 |
| Resin Solution B | 48 |
| Solvent (mixture of aliphatic and aromatic hydrocarbons) | 42 |
| | 100 |

EXAMPLE VIII

*Modified alkyd resin enamel*

| | |
|---|---|
| Manganese salt of azo dye pigment | 8 |
| Resin Solution A (50% solids) | 58 |
| Resin Solution C (assuming 50% solids) | 6 |
| Solvent (mixture of aliphatic and aromatic hydrocarbons) | 28 |
| | 100 |

It is understood that the usual substrata of the lake industry such as alumina hydrate, blanc fixe, etc., may be associated with the pigment toners herein described. However, the use of substrata in coating compositions of the type herein contemplated is subject to more or less well-defined limitations all of which are well understood by those skilled in the art.

Likewise, the use of minor amounts of foreign intermediates in the preparation of azo couplings to modify the resulting pigment is also contemplated and well known. Such modifications are to be considered as within the scope of the invention and any pigment of which the principal ingredient comprises the manganese salt of any one of the azo dyes herein contemplated is to be considered the equivalent of the pure pigment.

The noteworthy improvements attainable by use of the manganese toners of this invention in resinated coating compositions are also afforded by their use in other types of coatings, particularly when such toners are used in the conventional cellulose nitrate vehicles where natural resins, softeners and plasticizers, such as dibutyl phthalate or castor oil, or both, are present as essential ingredients, as well as in the recently developed type of cellulose nitrate compositions in which are present appreciable proportions of synthetic resins, such as the already mentioned modified alkyd types. The manner of preparation of such lacquer vehicles is also well-known.

When the pigments of this invention are formulated into coating compositions, they will, as stated, be found to be well suited for decorative and protective purposes on either metal or wood, and particularly well suited for protection from exposure to the elements, including bright sunlight. Due to their excellent pigmentary characteristics, said pigments afford a much broader range of shade in the red to maroon field in the preparation of durable enamels, and in addition permit the preparation of exceedingly durable enamels. The term "durability," as used herein, is meant to include both the integrity of the films and the color retention thereof. Films which show excellent integrity (freedom from any evidence of disintegration) may change in color either by fading or by darkening and the reverse may be true. The pigments and enamels of this invention give films which are durable in both respects, said pigments being not only free from any tendency to bleed in solvents employed in making up coating compositions, but are also quite fast towards light.

While, preferably, the invention contemplates manufacturing and using certain specific, preferred types of manganese toners as essential pigment ingredients in synthetic resin-containing coating compositions, and especially those of the alkyd resin type, it is broadly directed, as indicated, to the production and use in such coating compositions of the manganese salt of the azo dyestuff having the probable generic formula

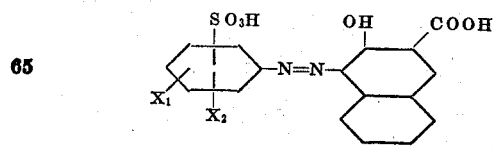

wherein $X_1$ represents a halogen (chlorine, bromine, iodine, etc.) and $X_2$ represents hydrogen or an alkyl (methyl, ethyl, propyl, butyl, etc.); the halogen, alkyl or $SO_3H$ substituents being attached to any open position in the benzene ring.

I claim as my invention:

1. A stable insoluble pigment of red to maroon shade comprising the manganese salt of the azo dyestuff having the probable formula

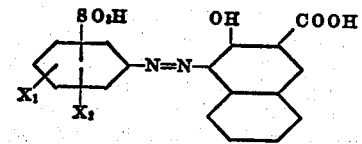

in which $X_1$ represents a halogen and $X_2$ is a member selected from the group consisting of hydrogen and an alkyl.

2. A stable insoluble pigment substance of red to maroon shade comprising the manganese salt of the azo dyestuff having the probable formula as the free acid:

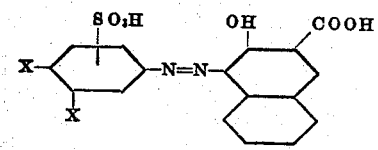

wherein one X represents a halogen and the other is a member selected from the group consisting of hydrogen and a methyl.

3. A stable insoluble pigment of red to maroon shade comprising the manganese salt of the azo dyestuff having the probable formula as the free acid:

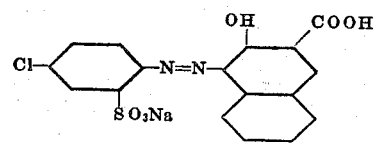

4. A stable insoluble pigment of red to maroon shade comprising the manganese salt of the azo dyestuff having the probable formula as the free acid:

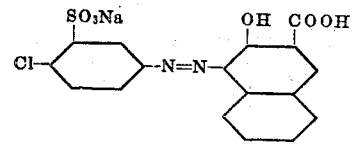

5. A stable insoluble pigment of red to maroon shade comprising the manganese salt of the azo dyestuff having the probable formula as the free acid:

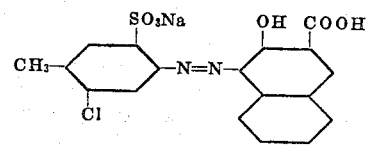

6. A durable coating composition of red to maroon shade containing as an essential vehicle-insoluble, non-bleeding pigment ingredient thereof the manganese salt of the azo dyestuff having the probable formula:

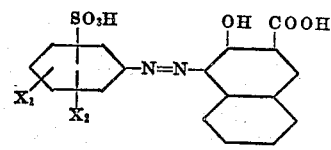

in which $X_1$ represents a halogen and $X_2$ is a member selected from the group consisting of hydrogen and an alkyl.

7. A durable coating composition of red to maroon shade containing as an essential vehicle-insoluble, non-bleeding pigment ingredient the manganese salt of the azo dyestuff having the probable formula, as the free acid:

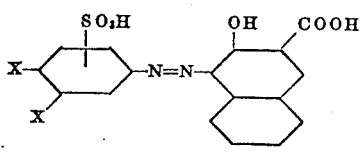

wherein one X represents a halogen and the other is a member from the group consisting of hydrogen and a methyl group.

8. A durable synthetic alkyd resin enamel of red to maroon shade containing as an essential vehicle-insoluble, non-bleeding pigment ingredient the manganese toner of the azo dyestuff having the probable formula, as the disodium salt:

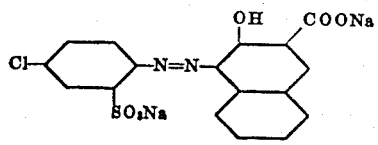

9. A durable synthetic alkyd resin enamel of red to maroon shade containing as an essential vehicle-insoluble, non-bleeding pigment ingredient the manganese toner of the azo dyestuff having the probable formula, as the disodium salt:

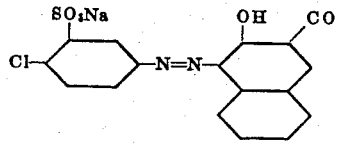

10. A durable synthetic alkyd resin enamel of red to maroon shade containing as an essential vehicle-insoluble, non-bleeding pigment ingredient the manganese toner of the azo dyestuff having the probable formula, as the disodium salt:

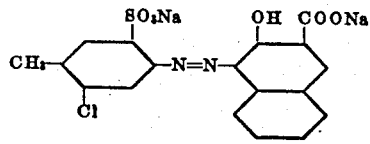

ALFRED SIEGEL.

Certificate of Correction

Patent No. 2,225,665. December 24, 1940.

ALFRED SIEGEL

It is hereby certified that errors appear in the printed specification of the above numbered patent requiring correction as follows: Page 2, first column, lines 3 to 8 inclusive, for that portion of the formula reading

lines 13 to 18 inclusive, for

and that the said Letters Patent should be read with these corrections therein that the same may conform to the record of the case in the Patent Office.

Signed and sealed this 18th day of February, A. D. 1941.

[SEAL]

HENRY VAN ARSDALE,
*Acting Commissioner of Patents.*